UNITED STATES PATENT OFFICE.

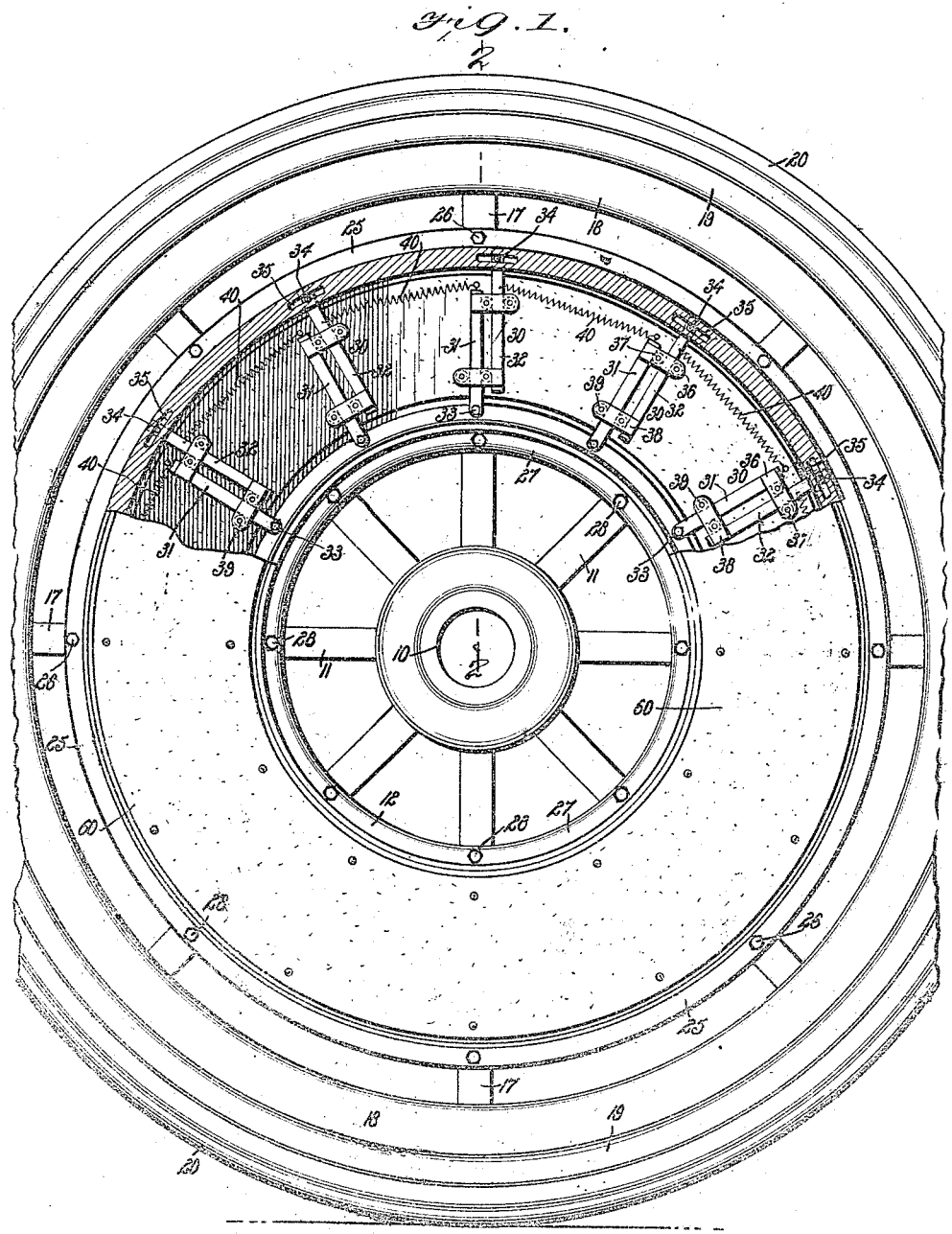

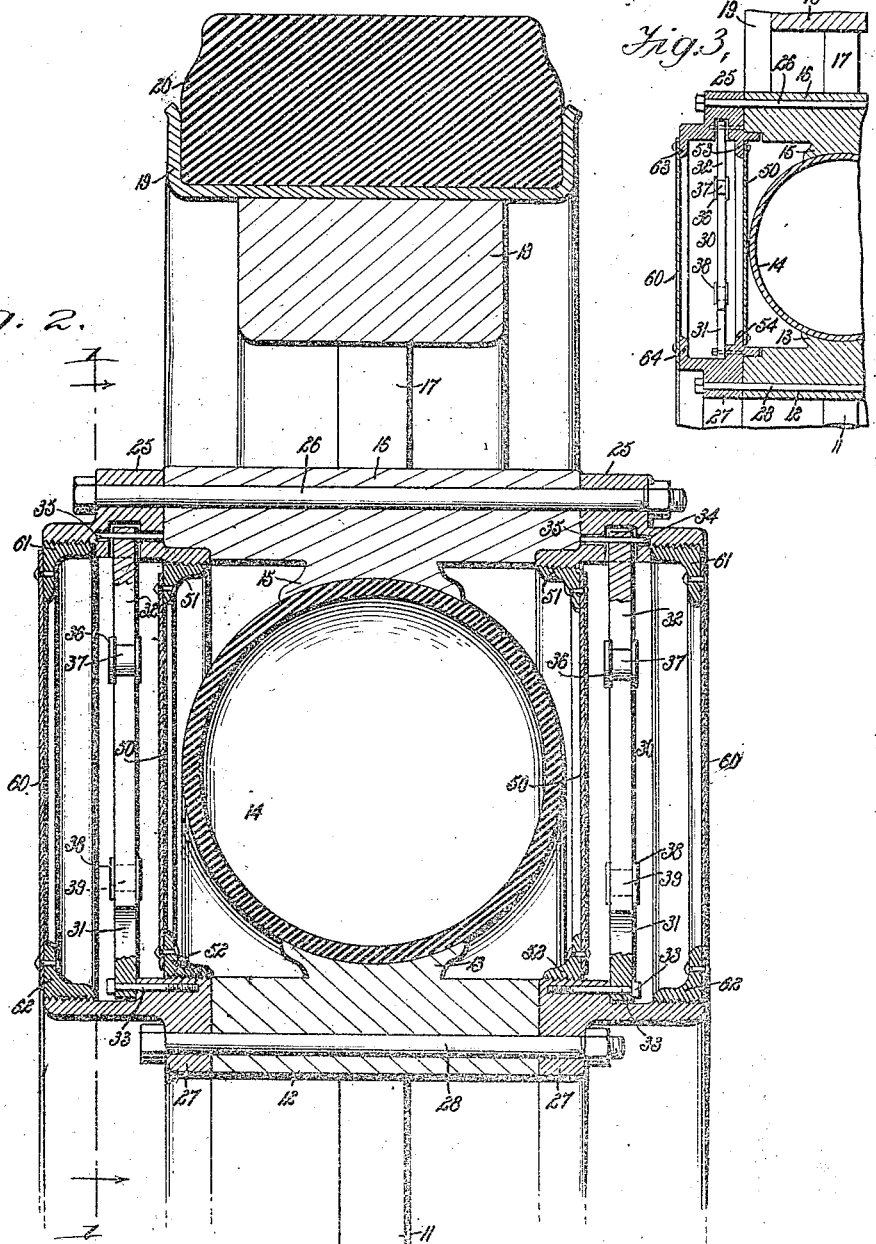

ALFRED FREUND, OF ST. LOUIS, MISSOURI.

RESILIENT VEHICLE-WHEEL.

1,194,163.   Specification of Letters Patent.   Patented Aug. 8, 1916.

Application filed March 15, 1916. Serial No. 84,303.

*To all whom it may concern:*

Be it known that I, ALFRED FREUND, a citizen of the United States, and a resident of St. Louis, in the State of Missouri, have invented a new and Improved Resilient Vehicle-Wheel, of which the following is a full, clear, and exact description.

The object of the invention is to provide a new and improved resilient vehicle wheel of the solid tread type and which is very simple and durable in construction and arranged to permit of readily assembling and disassembling the parts and to provide the desired resiliency without danger of punctures or blow-outs.

In order to accomplish the desired result, use is made of an inner rim provided with a hub, a felly having a solid tread, an outer rim connected with the felly, an inflatable tube interposed between the said rims, and links pivotally connecting the said rims with each other, each link being made in two parts slidable one on the other in the direction of the length of the link, the link section engaging the outer rim having a sliding connection with the same in the direction of the periphery of the rim.

A practical embodiment of the invention is represented in the accompanying drawings forming a part of this specification, in which similar characters of reference indicate corresponding parts in all the views.

Figure 1 is a face view of the resilient vehicle wheel with parts shown in section along the line 1—1 of Fig. 2; Fig. 2 is an enlarged cross section of the same on the line 2—2 of Fig. 1; and Fig. 3 is a reduced cross section of a modified form of the resilient wheel.

The hub 10 of the vehicle wheel is connected by spokes 11 with an inner rim 12 provided on its peripheral face with an annular seat 13 on which is seated an inflatable tube 14 engaged at its peripheral face by a seat 15 formed on the inner side of an outer rim 16 connected by spokes 17 with a felly 18. The felly 18 is provided with a tire 19 of any approved construction carrying a solid rubber tread 20. The inner rim 12 and the rim 16 are connected with each other at opposite sides of the flexible tube 14 by yielding connections and for this purpose the following arrangement is made: On the edges of the rim 16 are removably held rings 25 by transverse bolts 26 extending through the rim 16, as plainly indicated in the drawings, and similar rings 27 are removably fastened to the inner rim 12 by the use of bolts 28. The rings 25 and 27 on each side of the tube 14 are connected with each other by links 30 each made in two parts 31 and 32, of which the link part 31 is pivoted on a bolt 33 screwing in the ring 27. The other link part 32 is provided with a pivot 34 slidingly engaging slots 35 formed in the ring 25, as plainly shown in Figs. 1 and 2. The slots 35 extend in the direction of the periphery of the ring 25 thus allowing each link 30 to swing on the pivot 33 as the fulcrum. The link part 31 of each link 30 is provided with a guideway 36 having rollers 37 for the link part 32 to slide in and a similar guideway 38 provided with rollers 39 is arranged on the link part 32 for the link part 31 to slide in. Thus the two link parts 31 and 32 are mounted to slide one on the other without danger of binding owing to the use of the rollers 37 and 39. Springs 40 connect the link part 32 of one link 30 with the link part 31 of the next following link 30 so as to normally hold the links in the position shown in Fig. 1, that is, with the pivots 34 extending midway in their slots 35.

In order to protect the inflatable tube 14 against outside influences use is made of flexible ring-shaped covers 50, preferably made of rubber, and attached to the rings 51 and 52 screwing into the inner portions of the rings 25 and 27. Thus the covers 50 are interposed between the links 30 and the flexible tube 14.

In order to protect the links 30 against dust, rain, snow and other extraneous matter, use is made of ring-shaped covers 60, similar to the covers 50, and likewise preferably made of rubber. The covers 60 are fastened to rings 61 and 62 screwing in the outer portions of the rings 25 and 27. Thus by the arrangement described the links 30 extend between the covers 50 and 60 and the flexible tube 14 extends between the tube covers 50. Instead of attaching the tube covers 50 and 60 to the rings 51, 52 and 61, 62, the covers 50 may be attached to flanges 53, 54 formed on the rings 25 and 27, as plainly shown in Fig. 3, and the covers 60 may be attached to flanges 63 and 64 formed on the rings 25 and 27, otherwise the construction shown in this Fig. 3 is the same as above described relatively to Figs. 1 and 2.

It is understood that when the resilient wheel is in use and a load is applied then the inner rim 12 becomes eccentric relatively to the rim 16 attached to the felly 18 carrying the tread 20 and consequently the flexible tube 14 is compressed at the bottom as the wheel rolls along, and the link parts 31 and 32 of the several links are correspondingly lengthened and shortened as they reach the top, bottom and intermediate positions.

It will be noticed that by mounting the links 30 in the rings 25 and 27 and making the latter removable from the rim 16 and the inner rim 12, ready access can be had at any time to the tube 14 for removal or repairs as the case may be. It will also be noticed that by inclosing the links 30 between the covers 50 and 60 proper lubrication of the links can be maintained without interference by dust. It will also be seen that any set of links and their rings 25 and 27 can be removed from the wheel for repairs or other purposes without disturbing the other parts of the wheel.

Having thus described my invention, I claim as new and desire to secure by Letters Patent:

1. A resilient vehicle wheel, comprising an inner rim having a hub, a felly having a solid tread, an outer rim connected with the felly, resilient means interposed between the said rims, and links pivotally connecting the said rims with each other, each link being made in two parts slidable one on the other in the direction of the length of the link, the link section engaging the outer rim having a sliding connection with the same in the direction of the periphery of the rim.

2. A resilient vehicle wheel, comprising an inner rim having a hub, a felly having a solid tread, an outer rim connected with the felly, resilient means interposed between the said rims, and links pivotally connecting the said rims with each other, each link being made in two sections provided with roller guide-ways for the sections to slide one on the other.

3. A resilient vehicle wheel, comprising an inner rim having a hub, a felly having a solid tread, an outer rim connected with the felly, resilient means interposed between the said rims, and links pivotally connecting the said rims with each other, each link being made in two sections provided with roller guideways for the sections to slide one on the other, the outer section having a sliding connection with the outer rim in the direction of the periphery of the rim.

4. A resilient vehicle wheel, comprising an inner rim having a hub, a felly having a solid tread, an outer rim connected with the felly, resilient means interposed between the said rims, outer and inner link rings removably fastened to the edges of the said rims, and links pivotally connecting the said outer and inner link rings with each other, each link being made in sections slidable one on the other.

5. A resilient vehicle wheel, comprising an inner rim having a hub, a felly having a solid tread, an outer rim connected with the felly, resilient means interposed between the said rims, outer and inner link rings removably fastened to the edges of the said rims, links pivotally connecting the said outer and inner link rings with each other, each link being made in sections slidable one on the other, and flexible covers attached to the said inner and outer link rings and interposed between the resilient means and the links.

6. A resilient vehicle wheel, comprising an inner rim having a hub, a felly having a solid tread, an outer rim connected with the felly, resilient means interposed between the said rims, outer and inner link rings removably fastened to the edges of the said rims, links pivotally connecting the said outer and inner link rings with each other, each link being made in sections slidable one on the other, and flexible covers attached to the said inner and outer link rings in front of the said links.

7. A resilient vehicle wheel, comprising an inner rim having a hub, a felly having a solid tread, an outer rim connected with the felly, resilient means interposed between the said rims, outer and inner link rings removably fastened to the edges of the said rims, links pivotally connecting the said outer and inner link rings with each other, each link being made in sections slidable one on the other, the said outer and inner link rings being provided with threads at their outer and inner portions, cover rings screwing on the said threads, and flexible covers attached to the said cover rings.

8. A resilient vehicle wheel, comprising an inner rim having a hub, a felly having a solid tread, an outer rim connected with the felly, resilient means interposed between the said rims, outer and inner link rings removably fastened to the edges of the said rims, and links pivotally connecting the said outer and inner link rings with each other, each link being made in sections slidable one on the other, the said outer and inner link rings being provided with threads at their outer and inner portions, cover rings screwing on the said threads, and flexible covers attached to the said cover rings, the covers on the inner cover rings extending intermediate the resilient means and the links and the covers on the outer cover rings extending outside of the links.

9. A resilient vehicle wheel, comprising an inner rim, a hub connected with the inner rim, a felly having a solid tread, an outer rim within the felly and connected thereto, resilient means interposed between the said inner and outer rims, outer and inner rings removably fastened to the edges of the said outer and inner rims, and members connecting the said outer and inner rings with each other, each member being made in sections slidable one on the other in the direction of the length of the member, each section of a member being connected with one of said rings.

10. A resilient vehicle wheel comprising an inner rim, a hub connected with the inner rim, a felly having a solid tread, an outer rim within the felly and connected thereto, resilient means interposed between the said inner and outer rims, outer and inner rings removably secured to the edges of the said outer and inner rims, members connecting the said outer and inner rings with each other, each member being made in sections slidable one on the other in the direction of the length of the member, each section of a member being connected with one of said rings, and flexible covers secured to the said inner and outer rings, on opposite sides of the said connecting members.

In testimony whereof I have signed my name to this specification in the presence of two subscribing witnesses.

ALFRED FREUND.

Witnesses:
J. D. HEALY,
J. D. KIRBY.